US012534079B2

(12) United States Patent
Gao et al.

(10) Patent No.: US 12,534,079 B2
(45) Date of Patent: Jan. 27, 2026

(54) LOCATION OF VEHICLE TRACKING POINT

(71) Applicant: VOLVO TRUCK CORPORATION, Gothenburg (SE)

(72) Inventors: Yangyan Gao, Palo Alto, CA (US); Timothy Gordon, Lincoln (GB); Shammi Rahman, Lincoln (GB)

(73) Assignee: VOLVO TRUCK CORPORATION, Gothenburg (SE)

( * ) Notice: Subject to any disclaimer, the term of this patent is extended or adjusted under 35 U.S.C. 154(b) by 84 days.

(21) Appl. No.: 18/435,223

(22) Filed: Feb. 7, 2024

(65) Prior Publication Data

US 2024/0278780 A1 Aug. 22, 2024

(30) Foreign Application Priority Data

Feb. 22, 2023 (EP) ..................................... 23157913

(51) Int. Cl.
*B60W 30/18* (2012.01)

(52) U.S. Cl.
CPC ......... *B60W 30/18* (2013.01); *B60W 2520/10* (2013.01)

(58) Field of Classification Search
CPC .............. B60W 30/18; B60W 2520/10; G05D 2105/28; G05D 2107/13; G05D 2109/16; G05D 1/646
See application file for complete search history.

(56) References Cited

U.S. PATENT DOCUMENTS

| 6,285,945 B1* | 9/2001 | Sielagoski | ............ | B60W 30/16 |
| | | | | 180/170 |
| 2013/0179036 A1* | 7/2013 | Lee | ..................... | B62D 15/0255 |
| | | | | 701/41 |

(Continued)

FOREIGN PATENT DOCUMENTS

| CN | 110006419 A | 7/2019 |
| CN | 112486018 A | 3/2021 |

(Continued)

OTHER PUBLICATIONS

Extended European Search Report in corresponding European Application No. 23157913.7 dated Jul. 7, 2023 (10 pages).

(Continued)

*Primary Examiner* — George C Jin
(74) *Attorney, Agent, or Firm* — Jeffri A. Kaminski; Venable LLP

(57) ABSTRACT

A method of selecting a location of a tracking point for a vehicle unit of a vehicle includes dynamically adapting the location of the tracking point based on a vehicle speed. In some examples, the location of the tracking point for a relatively high speed is located (along the vehicle unit) in front of the location of the tracking point for a relatively low speed. Also disclosed is a method of determining a reference location of the tracking point for a reference speed. The method comprises evaluating vehicle motion behavior for a plurality of candidate locations of the tracking point, and selecting one of the candidate locations as the reference location based on vehicle motion behavior metric values acquired through the evaluation.

17 Claims, 6 Drawing Sheets

(56) References Cited

U.S. PATENT DOCUMENTS

| | | | | |
|---|---|---|---|---|
| 2013/0184926 A1* | 7/2013 | Spero | ................ | B60W 30/143 |
| | | | | 701/25 |
| 2019/0106149 A1* | 4/2019 | Kunihiro | ............... | B60W 10/20 |
| 2020/0094830 A1* | 3/2020 | Ito | ........................ | G05D 1/0291 |
| 2021/0109535 A1* | 4/2021 | Tansey | ................. | G05D 1/0011 |
| 2022/0314984 A1* | 10/2022 | Takahashi | ............. | B60W 30/12 |
| 2023/0234607 A1* | 7/2023 | Tomioka | ......... | B60W 30/18018 |
| 2025/0201036 A1* | 6/2025 | Maddock | ................. | G07C 5/02 |

FOREIGN PATENT DOCUMENTS

| | | | |
|---|---|---|---|
| CN | 114280922 A | | 4/2022 |
| CN | 114291117 A | | 4/2022 |
| CN | 114896694 A | | 8/2022 |
| WO | 2022248204 A1 | | 12/2022 |
| WO | 2022248399 A1 | | 12/2022 |

OTHER PUBLICATIONS

Björn Källstrand; "Documentation: Path generation & Path following approaches"; Jan. 2018; 31 pages.

Qingwei Liu et al; "A Novel Lateral Control Approach for Path Tracking of Automated Vehicles Based on Flow Guidance."; International Conference on Computing, Control and Industrial Engineering. Springer, Singapore, 2022; pp. 100-109; 10 pages; https://doi.org/10.1007/978-981-19-3927-3_10.

Shammi Rahman et al. "Improved Lateral Performance of a Long Combination Vehicle Based on Artificial Flow Guidance."; The IAVSD International Symposium on Dynamics of Vehicles on Roads and Tracks. Springer, Cham, 2022; pp. 726-735; 10 pages; https://doi.org/10.1007/978-3-031-07305-2_68.

T. J. Gordon, M. C. Best and P. J. Dixon, "An Automated Driver Based on Convergent Vector Fields"; Proceedings of the Institution of Mechanical Engineers, Part D: Journal of Automobile Engineering, 216 (4), pp. 329-347; 21 pages.

Shammi Rahman et al.; "Automated Steering Control for Precise Path Tracking and Improved Stability of Articulated Heavy Goods Vehicles"; Prepared using sagej.cls; Version: Jan. 17, 2017 v1.20]; 12 pages.

Myung-Wook Park et al; "Development of Lateral Control System for Autonomous Vehicle Based on Adaptive Pure Pursuit Algorithm."; 2014 14th International Conference on Control, Automation and Systems (ICCAS 2014). IEEE, 2014 ; 5 pages.

Shammi Rahman et al.; "Adaptive Steering Control for Automated Heavy Goods Vehicles"; AVEC'22; The 15th International Symposium on Advanced Vehicle Control; Sep. 12-16, 2022; 4 pages.

Kuwata Yoshiaki et al; "Motion Planning in Complex Environments Using Closed-loop Prediction"; AIAA Guidance, Navigation and Control Conference and Exhibit; Jun. 15, 2008; XP093059160, DOI: 10.2514/6.2008-7166; ISBN: 978-1-60086-999-0; pp. 1-22; 22 pages.

* cited by examiner

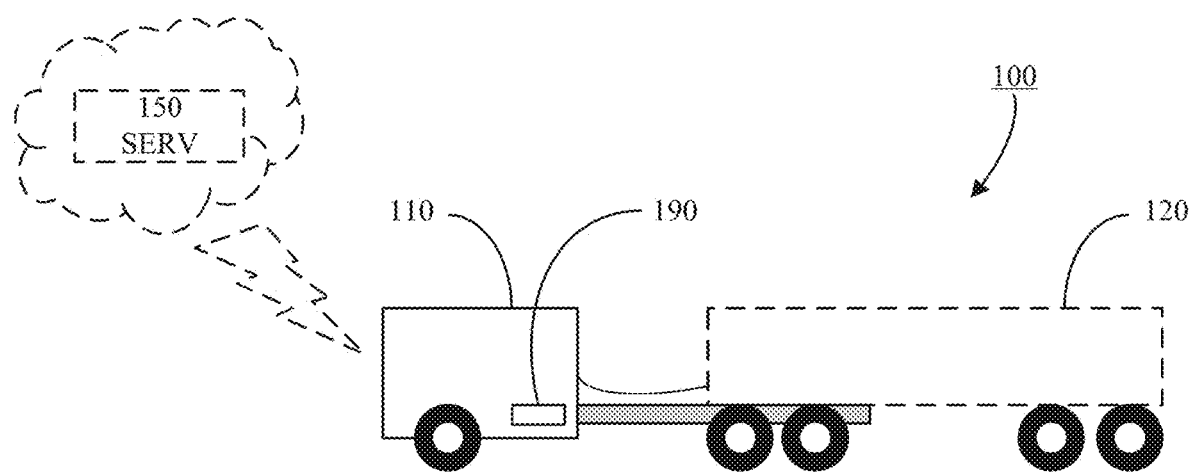
FIG. 1
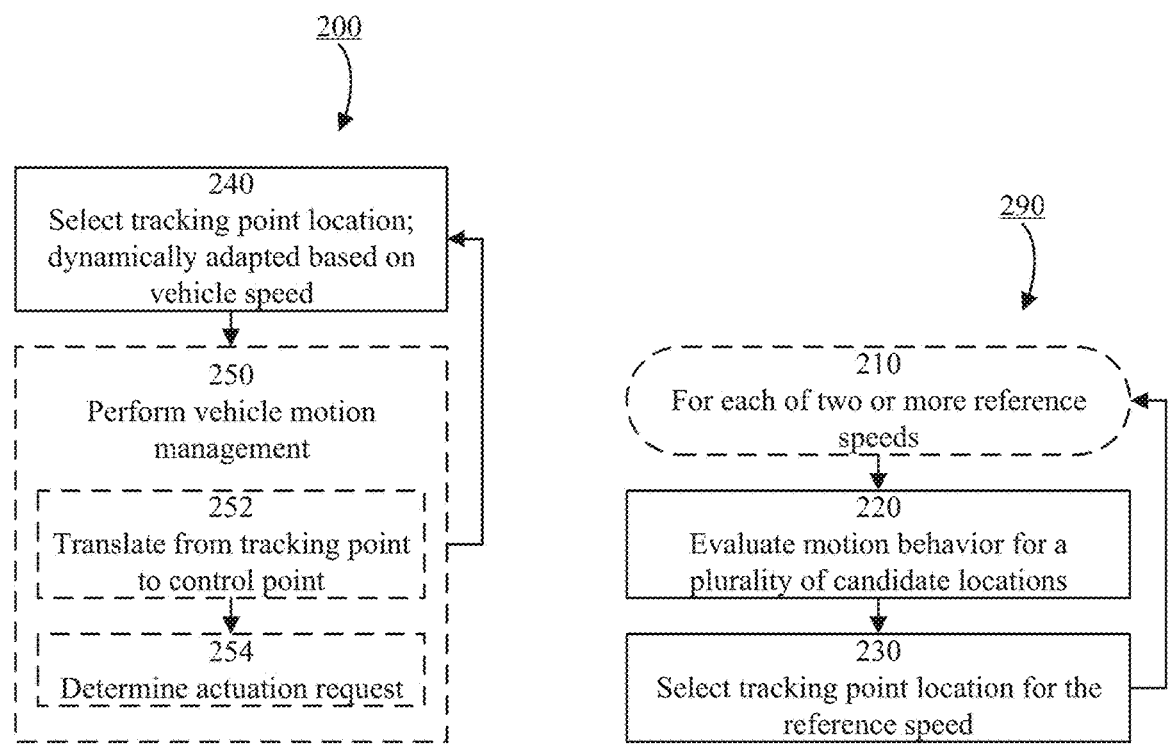
FIG. 2A
FIG. 2B

LOCATION OF VEHICLE TRACKING POINT

TECHNICAL FIELD

The disclosure relates generally to vehicle control, such as vehicle motion management (VMM). In particular aspects, the disclosure relates to the location of a vehicle tracking point. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Many applications for vehicle control (e.g., VMM) uses a representation of a vehicle, wherein the representation is defined via a point (a.k.a. particle) in space that represents the position of the vehicle. For example, path-following algorithms, such as pure pursuit and artificial flow guidance (AFG), determine a desired movement of a particle that represents the vehicle position, and control the vehicle based on the desired movement. Generally, path-following algorithms may be useful for implementing autonomous, or semi-autonomous, driving.

A point in space that represents the position of a vehicle may be referred to as a "tracking point".

Even though representation of vehicle position via a tracking point generally provides an efficient approach for vehicle control, inferior vehicle behavior is not always avoided. For example, in various scenarios, the vehicle control may suffer from one or more of the following problems: slow convergence to a desired path, oscillation behavior in relation to the desired path, poor ability to stay on the desired path, etc.

Therefore, there is a need for alternative ways to represent the position of a vehicle via a tracking point. Preferably, such alternative ways to represent the position of a vehicle via a tracking point lead to improved vehicle control (at least for some scenarios).

SUMMARY

According to a first aspect of the disclosure, a computer-implemented method of selecting a location of a tracking point for a vehicle unit of a vehicle comprises dynamically adapting, by processing circuitry of a computer system, the location of the tracking point based on a vehicle speed.

Typically, the location of the tracking point may be defined in relation to the vehicle unit. For example, the location of the tracking point may be defined along a longitudinal axis of the vehicle unit.

The first aspect of the disclosure may seek to represent the position of a vehicle in an alternative and/or improved manner; e.g., to implement a combination between a tracking point location which is suitable for relatively high speeds and a tracking point location which is suitable for relatively low speeds. A technical benefit may include improved vehicle control, such as vehicle motion management (VMM). More generally, a technical benefit may include increased flexibility, and/or improved accuracy, for vehicle position representation.

In some examples, including at least one preferred example, the vehicle unit may have a front end and a rear end, with a vehicle unit longitudinal direction defined from the rear end towards the front end. In such examples, dynamically adapting the location of the tracking point based on the vehicle speed may, optionally, comprise selecting a first location of the tracking point for a first vehicle speed and a second location of the tracking point for a second vehicle speed, wherein a direction from the second location towards the first location coincides with the vehicle unit longitudinal direction responsive to the first vehicle speed being higher than the second vehicle speed.

A technical benefit may include that acceptable vehicle motion stability may achieved for relatively high speeds, while adequate adherence to a desired path is achieved for relatively low speeds.

In some examples, including at least one preferred example, two (or more) reference speeds may optionally correspond to respective reference locations of the tracking point.

A technical benefit may include that the location can be accurately and/or efficiently adapted.

In some examples, including at least one preferred example, dynamically adapting the location of the tracking point based on the vehicle speed may optionally comprise selecting, responsive to the vehicle speed being between the reference speeds, the location of the tracking point to be between the respective reference locations.

A technical benefit may include that the selected location is likely to be relatively close to an optimal location for the tracking point.

In some examples, including at least one preferred example, the selected location may optionally correspond to a linear interpolation between the respective reference locations corresponding to the vehicle speed.

A technical benefit may include that the location selection can be implemented with relatively low complexity.

In some examples, including at least one preferred example, dynamically adapting the location of the tracking point based on the vehicle speed may optionally further comprise selecting, responsive to the vehicle speed being external to an interval between the reference speeds, the location of the tracking point to be the respective reference location that corresponds to the reference speed which is closest to the vehicle speed.

A technical benefit may include that the location of the tracking point remains within boundaries that corresponds to tracking point locations with proven vehicle behavior.

In some examples, including at least one preferred example, the method may optionally further comprise performing vehicle motion management by the processing circuitry, wherein the tracking point is used as a position representation of the vehicle unit.

A technical benefit may include improved vehicle motion management (VMM).

In some examples, including at least one preferred example, the method may optionally further comprise translating, by the processing circuitry, a desired vehicular motion for the tracking point to a corresponding desired motion for a control point of the vehicle, and determining, by the processing circuitry, an actuation request value based on the desired motion for the control point of the vehicle.

A technical benefit may include that an actuator may be adequately controlled to implement a desired vehicular motion for the tracking point, even if the location of the tracking point does not correspond to a place on the vehicle where the actuator is configured to apply its impact.

In some examples, including at least one preferred example, translating the desired vehicular motion for the tracking point to the corresponding desired motion for the control point may optionally comprise conditioning the translation on a zero side-slip vehicular motion for a translation point of the vehicle.

A technical benefit may include that the translation can be implemented with low complexity.

In some examples, including at least one preferred example, the tracking point and the control point may be on different vehicle units. In such examples, translating the desired vehicular motion for the tracking point to the corresponding desired motion for the control point may optionally comprise translating the desired vehicular motion for the tracking point to an intermediate desired motion for an intermediate point of the vehicle, wherein the intermediate point represents a connection between the different vehicle units, and translating the intermediate vehicular motion to the corresponding desired motion for the control point.

A technical benefit may include that an actuator may be adequately controlled to implement a desired vehicular motion for the tracking point, even if the location of the tracking point is on a different vehicle unit than the actuator impact location.

According to a second aspect of the disclosure, a computer-implemented method of determining—for a reference speed—a reference location of a tracking point for a vehicle unit of a vehicle comprises evaluating vehicle motion behavior to acquire vehicle motion behavior metric values for a plurality of candidate locations of the tracking point, and selecting one of the candidate locations as the reference location based on the vehicle motion behavior metric values.

The second aspect of the disclosure may seek to find a tracking point location for the reference speed that is relatively close to an optimal tracking point location for the reference speed (e.g., in terms of some desired vehicle motion behavior). A technical benefit may include enablement of improved vehicle control, such as vehicle motion management (VMM). More generally, a technical benefit may include decreased time delay and/or lowered complexity for tracking point selection while operating the vehicle (since the pre-determined reference location(s) may be used as a basis for the selection).

According to a third aspect of the disclosure, a computer system is provided, which comprises a processor device configured to select a location of a tracking point for a vehicle unit of a vehicle by dynamically adapting the location of the tracking point based on a vehicle speed.

The third aspect of the disclosure may seek to implement representation of the position of a vehicle in an alternative and/or improved manner; e.g., to enable a tracking point location selection which is suitable for relatively high speeds as well as for relatively low speeds. A technical benefit may include improved vehicle control, such as vehicle motion management (VMM). More generally, a technical benefit may include increased flexibility, and/or improved accuracy, for vehicle position representation.

According to a fourth aspect of the disclosure, a computer system is provided, which comprises a processor device configured to determine—for a reference speed—a reference location of a tracking point for a vehicle unit of a vehicle by evaluating vehicle motion behavior to acquire vehicle motion behavior metric values for a plurality of candidate locations of the tracking point, and selecting one of the candidate locations as the reference location based on the vehicle motion behavior metric values.

The fourth aspect of the disclosure may seek to implement pre-determination of a tracking point location for the reference speed that is relatively close to an optimal tracking point location for the reference speed (e.g., in terms of some desired vehicle motion behavior). A technical benefit may include enablement of improved vehicle control, such as vehicle motion management (VMM). More generally, a technical benefit may include decreased time delay and/or lowered complexity for tracking point selection while operating the vehicle (since the pre-determined reference location(s) may be used as a basis for the selection).

According to a fifth aspect of the disclosure, a computer program product is provided. The computer program product comprises program code for performing, when executed by the processor device, the method of the first aspect and/or the second aspect.

The fifth aspect of the disclosure may seek to convey program code for selection of tracking point location and/or determination of a reference location for a reference speed. A technical benefit may include that new vehicles and/or legacy vehicles may be conveniently configured, by software installation/update, to select the tracking point location flexibly.

According to a sixth aspect of the disclosure, a non-transitory computer-readable storage medium is provided. The non-transitory computer-readable storage medium comprises instructions, which when executed by a processor device, cause the processor device to perform the method of the first aspect and/or the second aspect.

The sixth aspect of the disclosure may seek to convey program code for selection of tracking point location and/or determination of a reference location for a reference speed. A technical benefit may include that new vehicles and/or legacy vehicles may be conveniently configured, by software installation/update, to select the tracking point location flexibly.

According to a seventh aspect of the disclosure, a vehicle is provided, which comprises one or more of: the computer system of the third aspect and/or fourth aspect, and a processor device configured to perform the method of the first aspect and/or the second aspect.

The seventh aspect of the disclosure may seek to provide a vehicle configured for improved motion control.

In some examples, any of the above aspects may additionally have features identical with or corresponding to any of the various features as explained above for any of the other aspects.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

FIG. 1 is a schematic drawing of a vehicle according to some examples.

FIG. 2A is a flow chart of a method for selecting tracking point location according to some examples.

FIG. 2B is a flow chart of a method for determining reference location(s) of the tracking point according to some examples.

DETAILED DESCRIPTION

Figure 3:
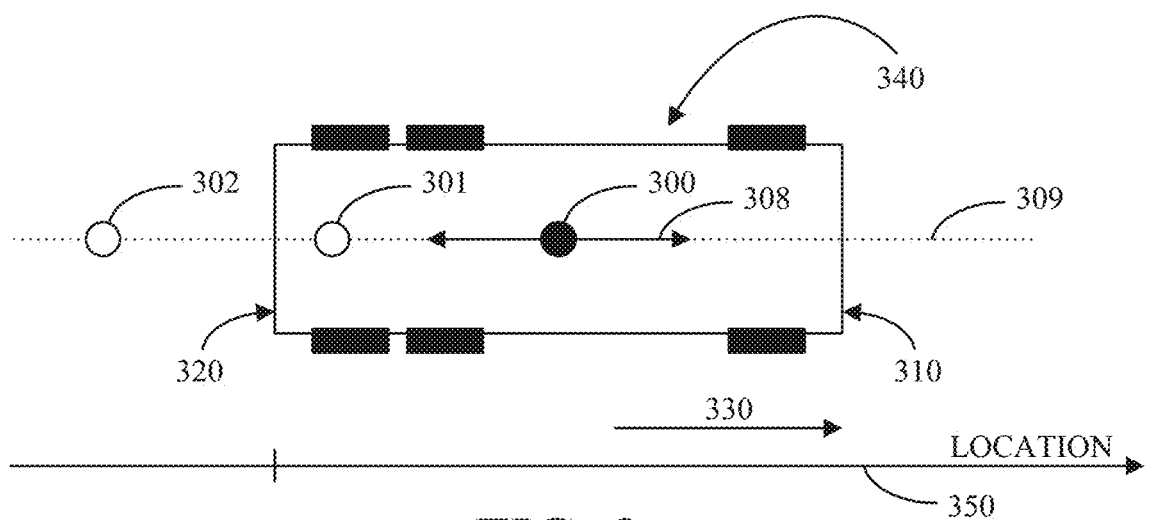
FIG. 3 is a schematic drawing illustrating the concept of a dynamically adaptable tracking point location according to some examples.

The detailed description set forth below provides information and examples of the disclosed technology with sufficient detail to enable those skilled in the art to practice the disclosure.

Generally, it should be noted that when the term "vehicle" is used herein, it may refer to a vehicle that comprises two or more vehicle units, or to a vehicle comprising a single vehicle unit. Similarly, it should be noted that when the term "vehicle unit" is used herein, it may refer to a vehicle unit that comprises two or more vehicle sub-units (where a vehicle sub-unit may, for example, consist of a rigid vehicle part), or to a vehicle unit comprising a single rigid vehicle part. Whenever the term "vehicle" is used herein, it should be understood that the statement wherein "vehicle" is used may be equally applicable for the term "vehicle unit", and vice versa.

In the following, representation of the position of a vehicle via a tracking point is described and exemplified, wherein selection of the location of the tracking point comprises dynamic adaptation of the location of the tracking point based on the vehicle speed.

Generally, a point in space that represents the position of a vehicle, or a vehicle unit, may be referred to as a "tracking point".

Thereby, flexibility is introduced for the location of the tracking point, which enables optimization of the vehicle behavior for different vehicle speeds. For example, optimum vehicle behavior at relatively high speed may be associated with a tracking point location which is different from the tracking point location associated with optimum vehicle behavior at relatively low speed, and the introduced flexibility enables the tracking point location to be adapted accordingly.

It should be noted that the suggested approaches are compatible with conventional vehicles (e.g., combination vehicles with active steering only for the front axle, and possibly passive steering for subsequent vehicle axes/units), as well as with more elaborate vehicles (e.g., combination vehicles with multi-axle steering).

Even though the dynamically adaptable tracking point location is exemplified herein in the context of vehicle motion management and path-following, it should be noted that the concept of a dynamically adaptable tracking point location may be applied in any suitable context where a tracking point is used as a representation of the position of a vehicle (or vehicle unit). Such suitable contexts include, but are not limited to, approaches for vehicle motion control, approaches for vehicle positioning, and approaches for vehicle response to dynamic changes in the environment (e.g., movements of obstacles, other vehicles, etc.).

FIG. 1 is a schematic drawing of a vehicle 100 for cargo transport where the herein disclosed techniques can be applied with advantage. The vehicle 100 comprises a truck or towing vehicle 110 configured to tow a trailer unit 120 in a known manner. The example tractor 110 comprises a vehicle control unit (VCU) 190 configured to perform various vehicle control functions, such as path following and vehicle motion management. The trailer unit 120 may optionally also comprise a VCU (not shown). The vehicle 100 is optionally connected via wireless link to a remote server (SERV) 150, which also comprises a control unit. The techniques disclosed herein may be performed by any of these control units, or by a combination of one or more of these control units. An on-board VCU 190 may also be parameterized by the remote server 150. The remote server 150, may, for example, be a cloud server, a server of a vehicle control system, or any other suitable server.

FIG. 2A illustrates an example method 200 for selecting tracking point location for a vehicle unit of a vehicle. The method 200 is a computer-implemented method, and is performed by processing circuitry of a computer system.

For example, the method 200 may be performed by the VCU 190 of FIG. 1. Alternatively or additionally, the method 200 may—at least partly—be performed by the server 150 of FIG. 1, wherein the tracking point location (or any other suitable parameter related to the tracking point location) may be provided (e.g., to the VCU 190) for control of the vehicle 100.

As illustrated by step 240, the method 200 comprises selecting the tracking point location by dynamically adapting the location of the tracking point based on vehicle speed.

Generally, the location of the tracking point is a representation of the position of the vehicle (or vehicle unit). For example, the location of the tracking point may be defined relative a vehicle(-unit)-centric coordinate system. Alternatively or additionally, the location of the tracking point may be defined along a longitudinal axis of the vehicle (unit). In a typical example with a first coordinate axis along the longitudinal direction of the vehicle (unit) and a second coordinate axis along the lateral direction of the vehicle (unit), the tracking point location may be defined by coordinates (x,0), where x is a variable that implements the dynamic adaptation of the location of the tracking point.

Generally, the vehicle speed may be any suitable speed metric of the vehicle (e.g., a speed in the longitudinal direction of the vehicle).

In some examples, the method 200 further comprises (e.g., prior to, or as part of, step 240) a step of acquiring an indication of the vehicle speed. For example, the indication of the vehicle speed may be acquired from one or more external units (e.g., a vehicle speedometer), or may be acquired through speed estimation by the processing circuitry that performs the method 200.

In some typical examples, and in terms of a longitudinal direction defined from the rear end of the vehicle towards the front end of the vehicle, the tracking point location for a relatively high vehicle speed is in front of the tracking point location for a relatively low vehicle speed.

Put differently, when the vehicle (unit) has a front end and a rear end, and a vehicle (unit) longitudinal direction is defined from the rear end towards the front end, dynamically adapting the location of the tracking point in step 240 may comprise selecting a first location of the tracking point for a first vehicle speed and a second location of the tracking point for a second vehicle speed, wherein a direction from the second location towards the first location coincides with the vehicle unit longitudinal direction if the first vehicle speed is higher than the second vehicle speed.

According to some examples, the location of the tracking point (e.g., in relation to a longitudinal direction defined from the rear end of the vehicle towards the front end of the vehicle) may be a—strictly, or non-strictly—growing function of the vehicle speed. For example, the function (in at least some speed interval(s)) may be an affine function with positive slope. Alternatively or additionally, the function (in at least some speed interval(s)) may be a constant function.

In some examples, two or more reference speeds correspond to respective reference locations of the tracking point.

Then, a function of the vehicle speed that defines the location of the tracking point may be a function that comprises all (or at least some) of the points defined by reference speed-location mapping. For example, the function may be defined by straight lines (linear interpolation) between each pair of reference speed-location points with neighboring reference speed values. Alternatively or additionally, a function of the vehicle speed that defines the location of the tracking point may be determined by an approach for fitting (e.g., using regression, minimum mean square error, or similar) a function type (e.g., an affine function, or a higher-degree polynomial function) to the points defined by reference speed-location mapping.

In some examples, there is only one reference speed that correspond to a respective reference location of the tracking point. Then, a function of the vehicle speed that defines the location of the tracking point may be a function that comprises the point defined by reference speed-location mapping. For example, the function may be defined by a straight line passing through the reference speed-location point; e.g., with some pre-defined slope or also passing through predetermined location for zero speed.

In some examples, dynamically adapting the location of the tracking point based on the vehicle speed may comprise, when the vehicle speed is between two reference speeds, selecting the location of the tracking point to be between the corresponding two reference locations (e.g., corresponding to a linear interpolation).

Alternatively or additionally, dynamically adapting the location of the tracking point based on the vehicle speed may comprise, when the vehicle speed is external to an interval between reference speeds (e.g., higher than a highest reference speed, or lower than a lowest reference speed), selecting the location of the tracking point to be equal to the respective reference location that corresponds to the reference speed which is closest to the vehicle speed. Thereby, the tracking point location may be kept within boundaries that correspond to the most extreme vehicle speeds for which the vehicle behavior has been evaluated.

As already mentioned, the dynamically adaptable tracking point location may be applied in any suitable context.

For example, the dynamically adaptable tracking point location may be applied for performing vehicle motion management (VMM), as illustrated by optional step 250. The VMM may be performed by the same processing circuitry that selects the tracking point location; or by another processing circuitry. In either case, the method 200 may—in addition to, or instead of, step 250—comprise providing the selected tracking point location for VMM.

The VMM may, for example, comprise vehicle motion control in relation to a reference path (e.g., path-following, such as pure pursuit or artificial flow guidance (AFG)).

In relation to the VMM, the tracking point is typically used as a position representation of the vehicle unit (e.g., a vehicle particle to be guided towards a goal point on the reference path in path-following).

When a desired vehicular motion (e.g., an acceleration, including a direction and a magnitude) has been acquired for the tracking point (e.g., by application of a path-following approach), such a desired vehicular motion may not be directly applicable for determining an actuation request for the vehicle. This may be particularly relevant when the tracking point location differs (e.g., in a longitudinal direction of the vehicle) from a location where actuation may be implemented. The location where actuation may be implemented (typically, a wheel axle with actuation; e.g., drive, steering, braking, etc.) may be defined by a "control point" of the vehicle (unit). For example, the control point may be defined along the longitudinal direction of the vehicle (e.g., as the center of a wheel axis).

To this end, some examples include translating a desired vehicular motion for the tracking point to a corresponding desired motion for a control point of the vehicle (as illustrated by optional sub-step 252), and determining an actuation request value based on the desired motion for the control point (as illustrated by optional sub-step 254). The translation of the desired vehicular motion for the tracking point to the corresponding desired motion for the control point may be achieved in any suitable way.

For example, the translation of the desired vehicular motion for the tracking point to the corresponding desired motion for the control point may comprise conditioning the translation on a zero side-slip vehicular motion for a translation point of the vehicle. More generally, any suitable kinematic constraint(s) may be used to condition the translation. The translation point may be defined as a location on the vehicle where it may be assumed that the side-slip is zero (or relatively close to zero—e.g., below a threshold value) with high probability. For example, the translation point may be defined along the longitudinal direction of the vehicle (e.g., as the center of a wheel axis without steering).

Alternatively or additionally, when the tracking point and the control point are on different vehicle units, the translation of the desired vehicular motion for the tracking point to the corresponding desired motion for the control point may comprise translating the desired vehicular motion for the tracking point to an intermediate desired motion for an intermediate point of the vehicle (e.g., using a translation point of the vehicle unit with the tracking point), wherein the intermediate point represents a connection between the different vehicle units, and translating the intermediate vehicular motion to the corresponding desired motion for the control point (e.g., using a translation point of the vehicle unit with the control point).

In some examples, the translation of the desired vehicular motion for the tracking point to the corresponding desired motion for the control point may comprise using two or more intermediate points (e.g., when there are one or more vehicle unit in between the unit with the tracking point and the unit with the control point. For example, the translation may comprise translating the desired vehicular motion for the tracking point to a first intermediate desired motion for a first intermediate point of the vehicle, wherein the first intermediate point represents a connection between the vehicle unit with the tracking point and a first intermediate vehicle unit, translating the first intermediate desired vehicular motion for the first intermediate point to a second intermediate desired motion for a second intermediate point of the vehicle, wherein the second intermediate point represents a connection between the first intermediate vehicle unit and a second intermediate vehicle unit, and so on until the vehicle unit with the control point is reached and a last intermediate vehicular motion may be translated to the corresponding desired motion for the control point.

FIG. 2B illustrates an example method 290 for determining reference location(s) of the tracking point for each of one or more reference speed(s). The method 290 is a computer-implemented method, and is performed by processing circuitry of a computer system.

For example, the method 290 may be performed by the VCU 190 of FIG. 1. Alternatively or additionally, the method 290 may—at least partly—be performed by the server 150 of FIG. 1, in which case the reference tracking point location(s) may be provided to the vehicle 100 (e.g., for execution of the method 200 of FIG. 2A). For example, the reference tracking point location(s) may be provided to the vehicle 100 by wireless signaling (when the vehicle is in motion, or stationary) or by wired signaling (e.g., when the vehicle is connected to an external computer system between transport missions).

The method 290 comprises—for each reference speed—evaluating vehicle motion behavior to acquire vehicle motion behavior metric values for a plurality of candidate locations of the tracking point, as illustrated by step 220.

Generally, the evaluation may be performed according to any suitable approach; e.g., using one or more of theoretical modeling, simulation, and testing.

For a particular reference speed to be processed, one or more vehicle motion scenarios may be applied for the evaluation. A typical vehicle motion scenario comprises adherence to a desired path that is not a straight line (i.e., the vehicle is required to perform some change of direction). Some example vehicle motion scenarios include "lane change", "roundabout", "curvature", and "turn".

Different reference speeds to be processed may apply the same, or different, vehicle motion scenarios. Typically, some scenarios may be mostly relevant for relatively low reference speeds (e.g., "roundabout" and "turn", which are unlikely to occur at relatively high speeds) and some scenarios may be mostly relevant for relatively high reference speeds (e.g., "lane change" and "curvature", which are unlikely to cause problematic vehicle behavior at relatively low speeds).

A vehicle motion behavior metric may be associated with each reference speed and/or with each vehicle motion scenario. For example, the "roundabout" scenario may be associated with a vehicle motion behavior metric that indicates swept path width (SPW; e.g., defined as the traffic lane width required to accommodate the lateral motions of the tires of the vehicle during execution of a specified maneuver), and the "lane change" scenario may be associated with a vehicle motion behavior metric that indicates rearward amplification (RWA; e.g., defined as the ratio between maximum values of the motion variable of interest—for example, yaw rate or lateral acceleration—for a following vehicle unit and the first vehicle unit during execution of a specified maneuver). Other examples of vehicle motion behavior metrics include tracking precision and yaw damping.

The plurality of candidate locations of the tracking point may be distributed according to any suitable principle. For example, they may be distributed between a front-most location and a rear-most location. Alternatively or additionally, they may be equidistantly distributed.

Generally, it should be noted that the (reference) location of the tracking point may be in front of a front end of the vehicle (unit), between a front end of the vehicle (unit) and a rear end of the vehicle (unit), or behind a rear end of the vehicle (unit). Thus, the tracking point location is not necessarily a location on the vehicle (unit).

When vehicle motion behavior metric values have been acquired, in step 220, for the candidate locations of a reference speed, the method 290 proceeds to step 230, where one of the candidate locations is selected as the reference location based on the vehicle motion behavior metric values.

The selection may be implemented according to any suitable principle. For example, the selection may comprise selecting a candidate location that has an optimum (maximum or minimum; depending on the nature of the metric) vehicle motion behavior metric value among the candidate locations of the plurality. Alternatively or additionally, the selection may comprise selecting a candidate location that has vehicle motion behavior metric below (or above; depending on the nature of the metric) a threshold. For the example vehicle motion behavior metrics SPW and RWA, it is typically desirable to have as low value as possible.

If several vehicle motion behavior metrics are evaluated for a same reference speed, the selection in step 230 typically comprises selecting the reference location based on a combination of the evaluated metrics. For example, a provisional location may be selected for each of the evaluated metrics, and the reference location may be selected as a (e.g., weighted) average of the provisional locations.

Typically, but not necessarily, the method 290 is performed for each of two or more reference speeds, as illustrated by optional looping step 210.

Based on the reference speed-location point(s) selected in step 230, a speed-location mapping may be determined (e.g., for use in step 240 of the method 200); e.g., by expressing the location of the tracking point as function of the vehicle speed, as elaborated on elsewhere herein.

Typically, method 290 is executed at least once before execution of method 200. Alternatively or additionally, method 200 is executed more often than method 290 (e.g., continuously).

It should be noted that the method 290 of FIG. 2B and the method 200 of FIG. 2A may be combined to form a method that comprises both determining reference location(s) of the tracking point according to method 290 and selection of tracking point location with dynamic adaptation according to method 200.

In practice, one possible implementation approach comprises a look-up table with reference speed-location mappings (e.g., for different vehicle configurations). The look-up table may be constructed based on the procedure of FIG. 2B, and may be used in step 240 of FIG. 2A to achieve relevant reference speed-location mappings, based on which the tracking point location are determined.

In some examples, a mapping from speed to location is determined beforehand also for a plurality of speeds which are not reference speeds (e.g., using interpolation between the reference speeds, or any other suitable approach). Then, the look-up table may also comprise such mappings, and step 240 of FIG. 2A may simply comprise looking up the tabulated speed which is closest to the current vehicle speed and applying the correspondingly tabulated tracking point location.

FIG. 3 schematically illustrates the concept of a dynamically adaptable tracking point location (compare with step 240 of the method 200 of FIG. 2A).

According to the example of FIG. 3, a vehicle (unit) 340 has an associated tracking point 300. As illustrated by 308, the location of the tracking point 300 is dynamically adaptable along a longitudinal axis 309 of the vehicle (unit).

For example, the location of the tracking point may be indicated as a coordinate value in a one-dimensional space spanning the longitudinal axis 309 of the vehicle (unit). In FIG. 3, such a one-dimensional space is exemplified using a "LOCATION" coordinate axis 350, where the location at the rear end 320 of the vehicle (unit) is represented by zero value and the direction 330 from the rear end 320 towards the front end 310 of the vehicle (unit) represents increasing values for representation of the location. Generally, any location (e.g., a default location of the tracking point) may be used to represent the zero value.

Generally, the location of the tracking point may be anywhere along the longitudinal axis 309; e.g., in front of the front end 310, in between the front end 310 and the rear end 320 as exemplified by 300 and 301, or behind the rear end 320 as exemplified by 302. However, according to various examples, the location of the tracking point may be limited by one or more boundaries along the longitudinal axis 309 (e.g., a front boundary and/or a rear boundary).

Figure 4:
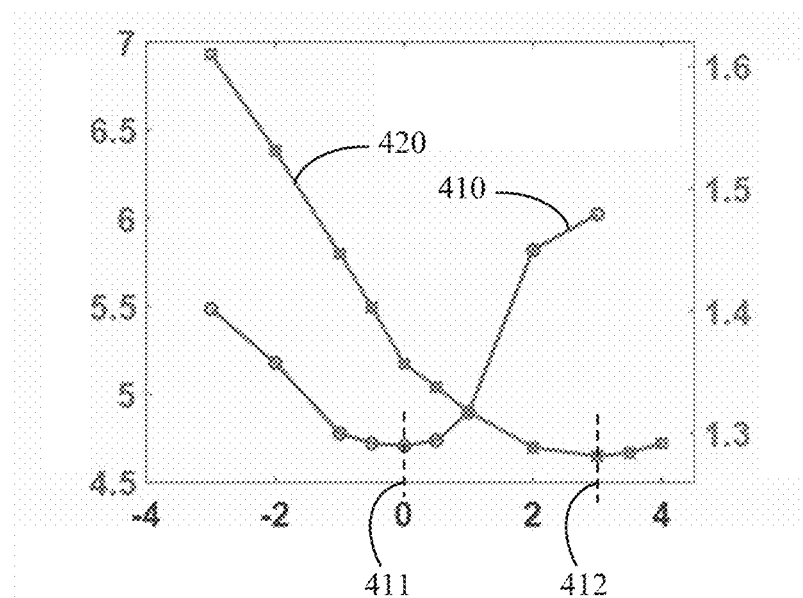
FIG. 4 is a plot illustrating determination of two reference locations of the tracking point according to some examples.

FIG. 4 is a plot illustrating example vehicle motion behavior metric values for determination of two reference locations of the tracking point (compare with the method 290 of FIG. 2B).

According to the example of FIG. 4, vehicle motion behavior for relatively low reference speed (e.g., 10 km/h) is evaluated for a plurality of candidate locations (in this example [−3, −2, −1, −0.5, 0, 0.5, 1, 2, 3]; e.g., meters in relation to a default location) and corresponding vehicle motion behavior metric values are acquired, as illustrated by 410. For example, the vehicle motion behavior for the relatively low reference speed may be swept path width (SPW) for a "roundabout" scenario, and the corresponding metric values may be as shown (in meters) on the left vertical axis in FIG. 4. Since the optimum vehicle motion behavior metric value (smallest SPW) among the candidate locations occurs for the candidate location 411 ("0"), this candidate location is preferably selected as the reference location for the relatively low reference speed.

According to the example of FIG. 4, vehicle motion behavior for relatively high reference speed (e.g., 80 km/h) is also evaluated for a plurality of candidate locations (in this example [−3, −2, −1, −0.5, 0, 0.5, 1, 2, 3, 3.5, 4]) and corresponding vehicle motion behavior metric values are acquired, as illustrated by 420. For example, the vehicle motion behavior for the relatively high reference speed may be yaw rate rearward amplification (RWA) for a "lane change" scenario, and the corresponding metric values may be as shown on the right vertical axis in FIG. 4. Since the optimum vehicle motion behavior metric value (smallest RWA) among the candidate locations occurs for the candidate location 412 ("3"), this candidate location is preferably selected as the reference location for the relatively high reference speed.

The principles applied in FIG. 4 may be seen as an example approach for achieving a general aim to optimize path tracking performance for low speed as well as motion stability for high speed.

Figure 5:
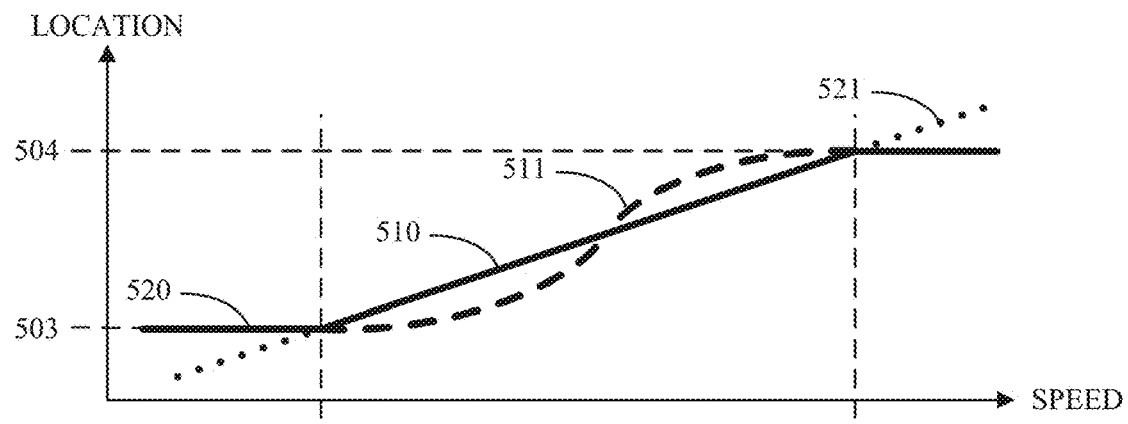
FIG. 5 is a schematic plot illustrating adaptation of the tracking point location based on vehicle speed according to some examples.

FIG. 5 schematically illustrates some examples for adaptation of the tracking point location based on vehicle speed (compare with step 240 of the method 200 of FIG. 2A). The location of the tracking point is represented by the vertical axis, the vehicle speed is represented by the horizontal axis, and the adaptation of the tracking point location based on vehicle speed may be seen as a mapping from vehicle speed to tracking point location.

In the example of FIG. 5, there are two reference speeds 501 and 502, with corresponding reference locations 503 and 504 (e.g., determined using the method 290 of FIG. 2B and/or according to the principles exemplified in FIG. 4).

When the vehicle speed is between the reference speeds, the tracking point location may be selected as a location between the reference locations. For example, a linear interpolation may be applied, as illustrated by 510. Generally, any suitable (e.g., monotonous) function may be used, as illustrated by 511. Also generally, the function may include the references (501,503) and (502,504), or may be otherwise related to them (e.g., via a suitable line, or curve, fitting approach).

When the vehicle speed is external to an interval between the reference speeds (i.e., to the right of 502 or to the left of 501 in FIG. 5), the tracking point location may be selected as the reference location 503, 504 that corresponds to the reference speed 501, 502 which is closest to the vehicle speed. Hence, when the vehicle speed is to the right of 502 in FIG. 5, the tracking point location may be selected as the reference location 504, and when the vehicle speed is to the left of 501 in FIG. 5, the tracking point location may be selected as the reference location 503, as illustrated by 520. Generally, any suitable function may be used for extension beyond the interval between the reference speeds (e.g., extrapolation 521 corresponding to a linear interpolation 510).

Figure 6:
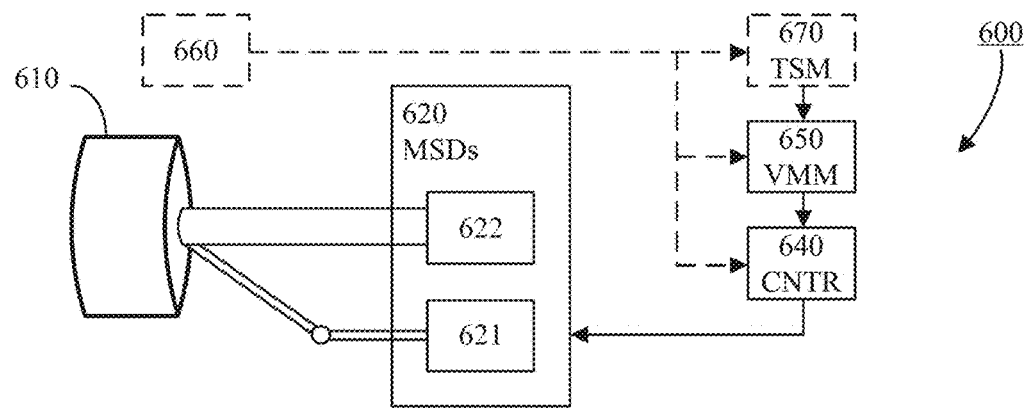
FIG. 6 is a schematic block diagram of a vehicle motion control system according to some examples.

FIG. 6 schematically illustrates functionality 600 for controlling a wheel 610 (e.g., on the tractor 110 of FIG. 1) by some example motion support devices (MSDs) 620; here comprising a power steering arrangement 621 and a propulsion device 622 such as an electric machine (EM). The power steering arrangement 621 and the propulsion device 622 are examples of actuators which can be controlled by one or more MSD control units (CNTR) 640.

A traffic situation management (TSM) function 670 plans driving operations with a time horizon (e.g., 1-10 seconds or so). This time frame may correspond to, for example, the time it takes for the vehicle to negotiate a curve. The vehicle maneuvers, planned and executed by the TSM, can be associated with acceleration profiles and curvature profiles which describe a desired vehicle movement (e.g., velocity and turning) for a given maneuver. The TSM may continuously request the desired acceleration profiles and curvature profiles from a vehicle motion management (VMM) function 650 which performs force allocation to meet the requests from the TSM in a safe and robust manner and communicates requests to the different MSDs. Typically, the VMM function 650 manages both force generation and MSD coordination (i.e., it may determine what forces that are required at the vehicle units in order to fulfil the requests from the TSM function 670, for instance to accelerate the vehicle according to a requested acceleration profile requested by TSM and/or to generate a certain curvature motion by the vehicle also requested by TSM). The forces may comprise e.g., yaw moments, longitudinal forces, and lateral forces, as well as different types of torques to be applied at different wheels.

The MSD control unit 640, the VMM function 650, and the TSM function 670 have access to sensor data from various on-board vehicle sensors 660, upon which vehicle control may be based. These sensors may comprise, e.g., global positioning system (GPS) receivers, vision-based sensors, wheel speed sensors, radar sensors and/or lidar sensors. The sensors are, among other things, configured to determine a vehicle location in relation to a reference path.

The dynamically adaptable tracking point location may be used in the TSM function 670. For example, the TSM function 670 may implement a path-following approach which provides a desired vehicle motion (e.g., a desired directional acceleration) for a vehicle particle, wherein the dynamically adaptable tracking point location may be applied as the vehicle particle. To this end, step 240 of the method 200 of FIG. 2A may be performed by the TSM function 670, according to some examples.

Alternatively or additionally, the dynamically adaptable tracking point location may be used in the VMM function 650. For example, the VMM function 650 may use a desired vehicle motion for a vehicle particle (e.g., the dynamically adaptable tracking point location) to determine suitable actuator request(s) to be applied at a control point. To this end, step 250 of the method 200 of FIG. 2A (including the translation of the desired vehicle motion) may be performed by the VMM function 650, according to some examples.

Figure 7:
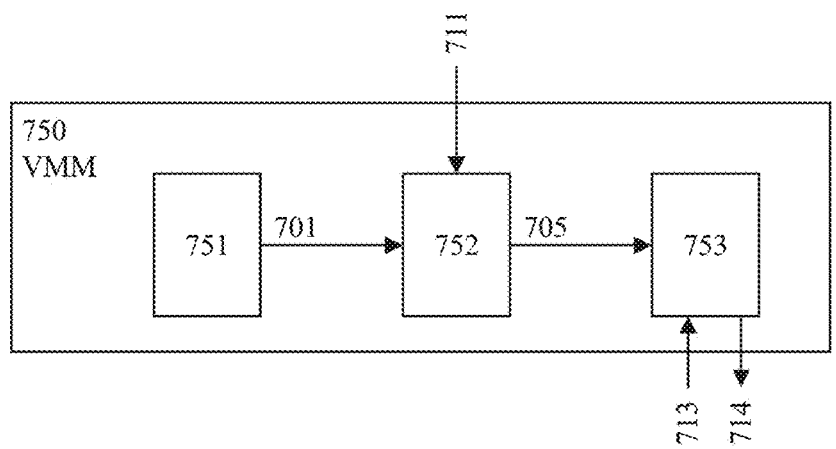
FIG. 7 is a schematic block diagram of vehicle motion management according to some examples.

FIG. 7 schematically illustrates a simplified vehicle motion management (VMM) 750 according to some examples. For example, the VMM 750 may illustrate a possible implementation of the VMM function 650 of FIG. 6. Alternatively or additionally, the VMM 750 may be comprised in the vehicle control unit 190 of FIG. 1.

The VMM 750 comprises motion estimation 751, global force generation 752, and motion coordination 753.

The motion estimation 751 is configured to provide measured/estimated parameters 701 representing the current motion of the vehicle to the global force generation 752. For example, the parameters 701 may comprise one or more of: vertical force $F_z$, friction between road and tire u (which may be used for slip detection), vehicle velocity in relation to a vehicle-centered coordinate system $v_x$, road gradient (or road slope) α, and road banking β.

The global force generation 752 is configured to determine global forces elements v based on the parameters 701 representing the current motion of the vehicle and based on motion requests 711 (e.g., an acceleration request). The global force generation 752 is also configured to provide the determined global forces elements 705 to the motion coordination 753.

The motion coordination 753 is configured to receive information 713 regarding the motion support devices of the vehicle. The motion coordination 753 is further configured to determine actuator request elements u based on the determined global forces elements v and the information 713 regarding the motion support devices (compare with sub-step 254 of the method 200 of FIG. 2A). The motion coordination 753 is also configured to provide information 714, including the actuator request elements u, for operation of the plurality of motion support devices.

For example, the motion request 711 may correspond to a desired vehicle motion for a dynamically adaptable tracking point location, and the global force generation 752 and/or the motion coordination 753 may be configured to perform translation to a desired vehicle motion at a control point (compare with sub-step 252 of the method 200 of FIG. 2A).

Figure 8A:
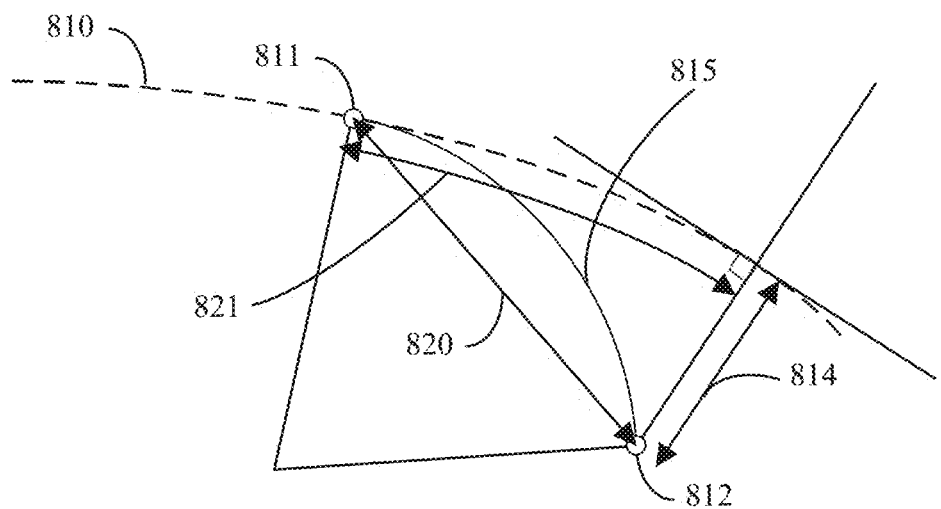
FIG. 8A is a schematic drawing illustrating a path following approach based on pure pursuit according to some examples.

FIG. 8A schematically illustrates some example principles of a path following approach based on pure pursuit.

In the illustration, the vehicle location 812 has a lateral offset 814 relative the reference path 810.

The applied path following approach includes steering— from the vehicle location 812—towards a goal point 811 on the reference path 810. The goal point 811 is distanced along the reference path 810 by a preview distance, which may be measured from the vehicle location 812 as illustrated by 820, or along the reference path 810 as illustrated by 821.

For example, steering from the vehicle location 812 towards the goal point 811 may comprise striving for following the adjustment path 815.

In some examples, the dynamically adaptable tracking point described herein may be used as the vehicle location 812; with the pure pursuit approach formulation adapted accordingly.

Figure 8B:
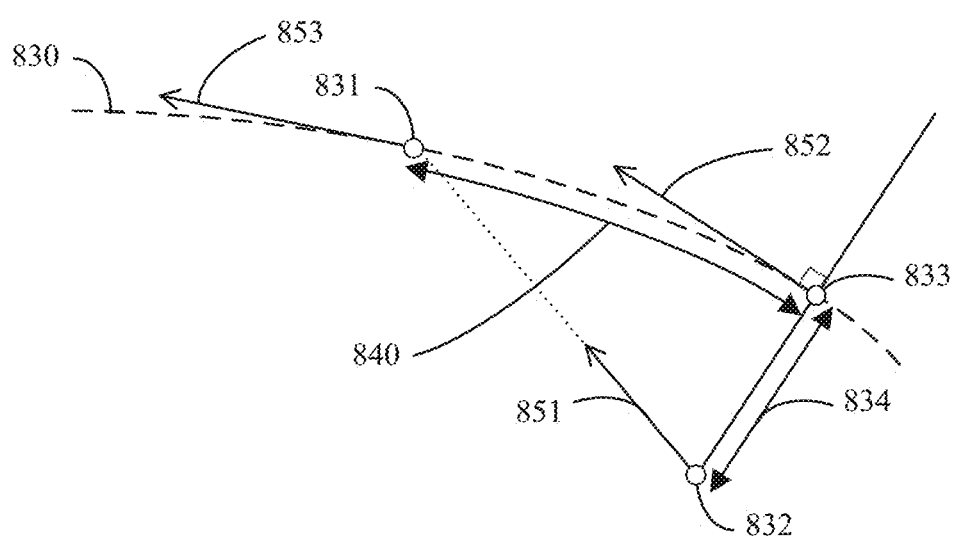
FIG. 8B is a schematic drawing illustrating a path following approach based on vector field guidance according to some examples.

FIG. 8B schematically illustrates some example principles of a path following approach based on vector field guidance. A general idea in relation to the vector field guidance approach may be seen as generating a vector field with location-specific guiding vectors, and controlling the vehicle according to the guiding vector at the current position 832 of the vehicle. One example of vector field guidance is artificial flow guidance (AFG).

In the illustration, the vehicle location 832 has a lateral offset 834 relative the reference path 830.

The applied path following approach includes steering— from the vehicle location 832—towards a goal point 831 on the reference path 830. The goal point 831 is distanced along the reference path 830 by a preview distance 840 measured from a reference location 833, which corresponds to an orthogonal projection of the vehicle location 832 on the reference path 830.

In some examples, the dynamically adaptable tracking point described herein may be used as the vehicle location 832.

For example, steering from the vehicle location 832 towards the goal point 831 may comprise striving for following a location-specific guiding vector w (e.g., representing a desired vehicle motion at the vehicle location).

Generally, some path following approaches based on vector field guidance determines the location-specific guiding vector w based on one or more of: the vector 851 (which is specific to the vehicle location 832, and points towards the goal point 831), the vector 852 (which is specific to the reference location 833, and points along the tangent of the reference path 830), and the vector 853 (which is specific to the goal point 831, and points along the tangent of the reference path 830).

For example, a location-specific guiding vector w of a vector field may be determined such that it points from the location 832 at hand towards the goal point 831 on the reference path; e.g., $w=t_3$ where $t_3$ is a unit-length vector pointing directly towards the goal point for the location at hand (compare with 851 of FIG. 8B). According to some examples, the direction of the location-specific guiding vector w is adjusted in dependence of the curvature of the reference path 830; e.g., to avoid 'cutting corners/curves'. For example, the location-specific guiding vector w may be defined as $$w = t_3 + \frac{t_1 - t_2}{2\cos\theta},$$

where $t_3$ is a unit-length vector pointing directly towards the goal point for the location at hand (compare with 851 of FIG. 8B), $t_1$ and $t_2$ are unit-length tangent vectors at the reference point and the goal point, respectively (compare with 852 and 853 of FIG. 8B), and the angle θ corresponds to half the angle between $t_1$ and $t_2$. The term $$\frac{t_1 - t_2}{2\cos\theta}$$

may be seen as a directional adjustment relating to reference path curvature; i.e., relating to the case $t_1 \neq t_2$.

Figure 8C:
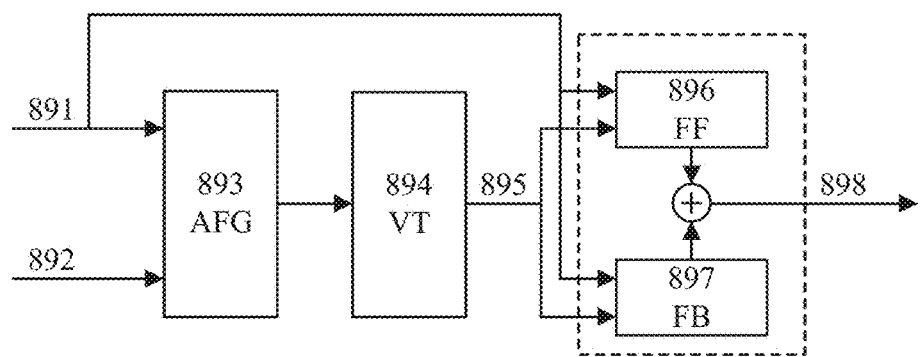
FIG. 8C is a schematic block diagram illustrating application of a dynamically adaptable tracking point location for vehicle motion management according to some examples.

FIG. 8C schematically illustrates example AFG control, where a dynamically adaptable tracking point location is applied for vehicle motion management. For example, the example AFG control of FIG. 8C may be used for TSM function 670 and/or the VMM function 650 of FIG. 6. Alternatively or additionally, the example AFG control of FIG. 8C may implement one or more steps of the method 200 of FIG. 2A.

Vehicle signals based on the dynamically adaptable tracking point location are provided at 891 and a map of the reference path is provided at 892. For example, the vehicle signals 891 may comprise indication of one or more of: the position of the tracking point in global coordinates (the preview position), the orientation of the tracking point in global coordinates, the longitudinal velocity of the tracking point, and the lateral velocity of the tracking point.

By means of an AFG block 893, a reference flow vector w (representing a desired vehicle movement; e.g., a desired velocity) at the tracking point is constructed based on AFG principles. In some examples, the reference flow vector w may be converted from an inertial coordinate system to a vehicle unit body coordinate system, and/or normalized so that the longitudinal component equals a unit value (e.g., 1).

By means of a vector translation (VT) block 894, the desired velocity $\vec{v}_{trk}$ at the tracking point is translated to a corresponding desired velocity $\vec{v}_{ref}$ at a control point, or at an intermediate point if the control point and the tracking point are on different vehicle units (compare with sub-step 252 of FIG. 2A).

To this end, a translation point may be used where the side-slip is assumed to be zero (or close thereto). The translation point may be based on vehicle kinematics and/or current operating conditions of the vehicle. For example, the translation point may correspond to an non-steered wheel axle. The translation point is helpful since the zero side-slip assumption corresponds to that the vector representing a velocity $\vec{v}_{trl}$ at the translation point is parallel to the longitudinal direction of the vehicle (unit). Thereby, the translation point may be used to construct an instantaneous center of rotation for the vehicle (unit). Typically, the instantaneous center of rotation lies on a line drawn orthogonally to the longitudinal axis of the vehicle (unit) and passing through the translation point.

Thus, the translation may comprise determining the desired velocity $\vec{v}_{ref}$ at the control point by using $$v_{ref} = \left(\frac{x}{L}\right) v_{trk} + \left(1 - \frac{x}{L}\right) v_{trl} = \left(\frac{x}{L}\right) v_{trk}$$

for the lateral component and using the unit value (e.g., 1) for the longitudinal component, wherein x represents the longitudinal distance between the control point (or intermediate point) and the translation point, and L represents the longitudinal distance between the tracking point and the translation point. In some examples, the desired velocity $\vec{v}_{ref}$ at the control point may be converted from a vehicle unit body coordinate system to an inertial coordinate system to provide a reference flow vector $\hat{w}_{ref}$ 895 for the control point.

The reference flow vector 895 for the control point is used to provide a steering control value $\delta_{tot}$ as illustrated by 898. The steering value may be seen as an example of an actuation request value (e.g., provided by a VMM function of the vehicle). Typically, the steering control value corresponds to a desired steering angle to be applied at the control point.

According to some examples, the steering control value is a total steering angle (e.g., determined as a sum of a feedforward steering angle term and a feedback steering angle term).

For example, a feedforward (FF) control block 896 may determine an angular value (feedforward steering angle term) that corresponds to the difference between an angular value of the reference flow vector 895 and a vehicle unit yaw value ψ: $\delta_{ff} = \angle \hat{w}_{ref} - \psi$. Alternatively or additionally, a feedback (FB) control block 897 may determine an angular error value $e_{fb}$ that corresponds to a (possibly scaled) difference between an angular value of the vehicle velocity V and an angular value of the reference flow vector 895. For example, the scaled difference may be determined as $e_{fb} = U(\angle V - \angle \hat{w}_{ref})$, where U represents the vehicle speed (e.g., the longitudinal velocity of the tracking point). The angular error value may be used to determine a feedback value (feedback steering angle term); e.g., by using proportional-integral-derivative (PID) principles, $\delta_{fb} = k_p e_{fb} + k_i \int e_{fb} + k_d \dot{e}_{fb}$. The result of the blocks 896 and 897 may be combined (e.g., added) to provide the steering angle control value; $\delta_{tot} = \delta_{ff} + \delta_{fb}$.

Figure 9A:
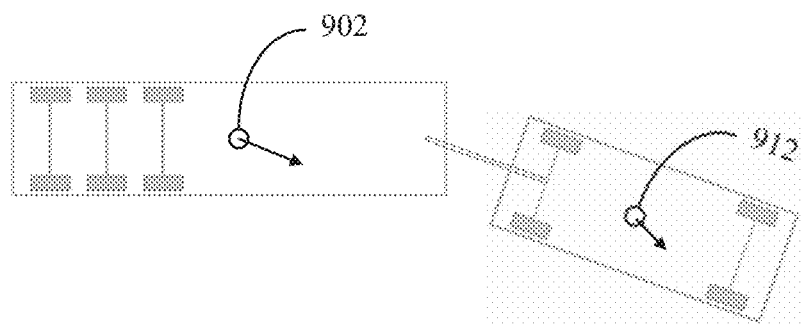
FIG. 9A is a schematic drawing illustrating a dynamically adaptable tracking point location according to some examples.

FIG. 9A schematically illustrates a dynamically adaptable tracking point location according to some examples. In this example, there is shown one tracking point location 912 on the tractor unit and one tracking point location 902 on the tractor unit.

In some scenarios, two tracking points (one per vehicle unit, each having a dynamically adaptable location) may be collectively applied for motion control of the vehicle (e.g., when each vehicle unit has some steering possibilities). Thus, the tracking point location 912 may be for controlling the tractor unit and the tracking point location 902 may be for controlling the trailer unit.

Alternatively or additionally, a tracking point (e.g., the one for the tractor unit) may have a location which is dynamically adaptable along the longitudinal direction of the tractor and the trailer. Thus, the tracking point locations 912 and 902 may be different locations of a single tracking point for controlling the tractor unit.

Figure 9B:
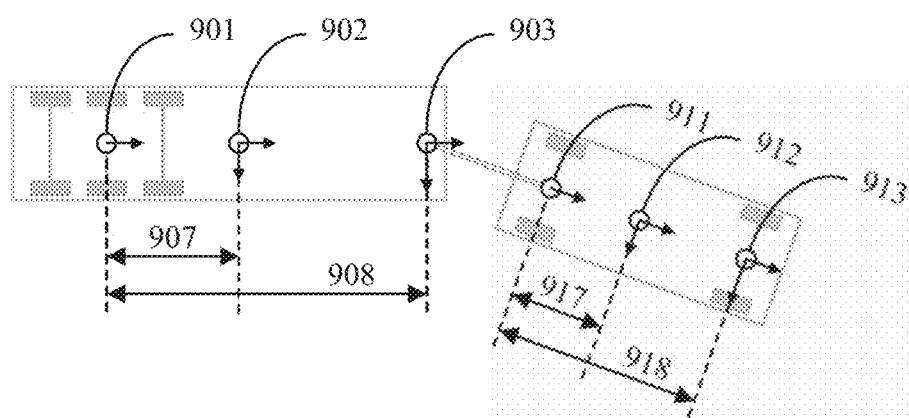
FIG. 9B is a schematic drawing illustrating translation of a tracking point location according to some examples.

FIG. 9B schematically illustrates translation of a tracking point location according to some examples.

For control of the tractor unit, the desired velocity at tracking point location 912 may be translated to a corresponding desired velocity at a control point 913 via a zero side-slip translation point 911, by using uniformity principles (e.g., as described in connection with FIG. 8C) in relation to the longitudinal distance 918 between the control point and the translation point, and the longitudinal distance 917 between the tracking point and the translation point.

Also for control of the tractor unit, the desired velocity at tracking point location 902 may be translated to a corresponding desired velocity at an intermediate point 903 via a zero side-slip translation point 901, by using uniformity principles in relation to the longitudinal distance 908 between the intermediate point and the translation point, and the longitudinal distance 907 between the tracking point and the translation point. Then, the desired velocity at the intermediate point 903 may be translated to a corresponding desired velocity at the control point 913 via a zero side-slip translation point 911, by using uniformity principles in relation to the longitudinal distance 918 between the control point and the translation point, and the longitudinal distance (not shown) between the intermediate point 903 and the translation point 911.

Figure 10:
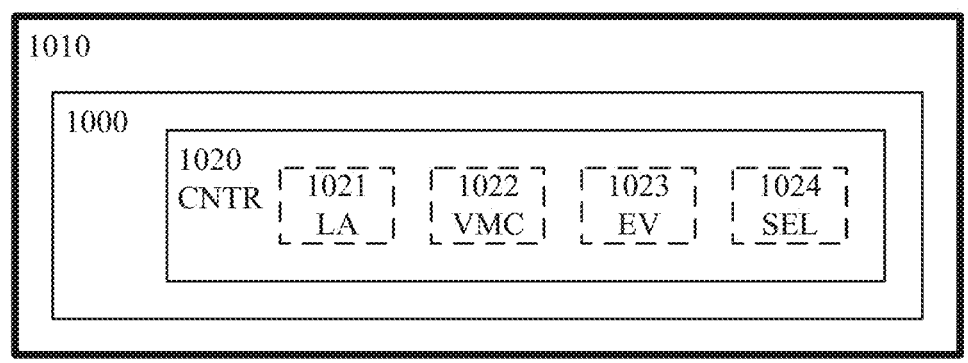
FIG. 10 is a schematic block diagram illustrating an apparatus for selection of a tracking point location according to some examples.

FIG. 10 schematically illustrates an example apparatus 1000 for selection of a tracking point location (compare with the method 200 of FIG. 2A) and/or for determining a reference tracking point location for a reference speed (compare with the method 200 of FIG. 2A).

For example, the apparatus 1000 may be configured to perform, or cause performance of, one or more steps as described in connection with FIG. 2A and/or FIG. 2B. Alternatively or additionally, the apparatus 1000 may be comprised, or comprisable, in an on-board vehicle control unit 1010 (e.g., the VCU 190 of FIG. 1). Yet alternatively or additionally, the apparatus 1000 may be comprised, or comprisable, in remote computer system unit (e.g., the server 150 of FIG. 1).

The apparatus 1000 comprises a controller (CNTR; e.g., controlling circuitry or a control module) 1020.

In some examples, the controller 1020 is configured to cause dynamic adaptation of the location of the tracking point based on a vehicle speed (compare with step 240 of FIG. 2A). To this end, the controller 1020 may comprise, or be otherwise associated with (e.g., connected, or connectable, to) a location adapter (LA; e.g., location adapting circuitry or a location adaptation module) 1021. The location adapter 1021 may be configured to apply dynamic adaptation of the location of the tracking point based on a vehicle speed.

In some examples, the controller 1020 may be further configured to cause performance of vehicle motion management, wherein the tracking point is used as a position representation of the vehicle unit (compare with step 250 of FIG. 2A). To this end, the controller 1020 may comprise, or be otherwise associated with (e.g., connected, or connectable, to) a vehicle motion controller (VMC; e.g., vehicle motion controlling circuitry or a vehicle motion control module) 1022. The vehicle motion controller 1022 may be configured to perform vehicle motion management, wherein the tracking point is used as a position representation of the vehicle unit. For example, the VCM 1022 may comprise, or be comprised in, the TSM 670 and/or the VMM 650 of FIG. 6.

Alternatively or additionally, the controller 1020 is (in some examples) configured to cause—for a reference speed—evaluation of vehicle motion behavior for a plurality of candidate locations of the tracking point and selection of one of the candidate locations as the reference location based on vehicle motion behavior metric values acquired by the evaluation (compare with steps 220 and 230 of FIG. 2B). To this end, the controller 1020 may comprise, or be otherwise associated with (e.g., connected, or connectable, to) an evaluator (EV; e.g., evaluating circuitry or an evaluation module) 1023 and a selector (SEL; e.g., selecting circuitry or a selection module) 1024. The evaluator 1023 may be configured to evaluate vehicle motion behavior for a plurality of candidate locations of the tracking point and the selector 1024 may be configured to select one of the candidate locations as the reference location based on vehicle motion behavior metric values acquired by the evaluation.

Figure 11:
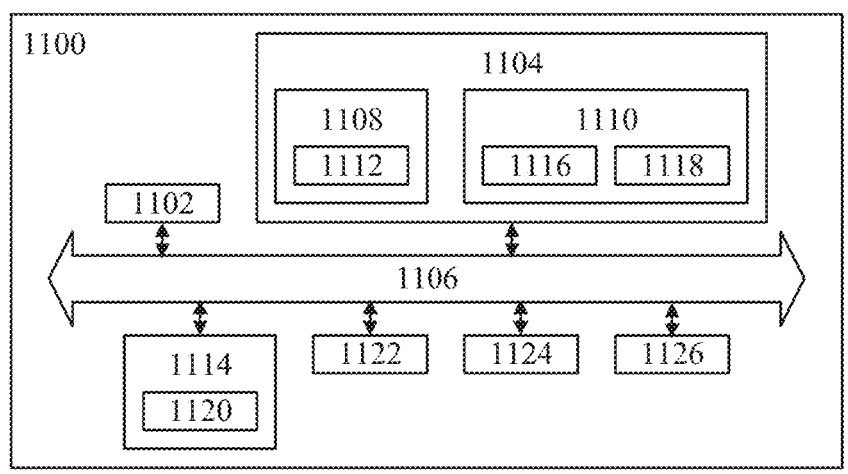
FIG. 11 is a schematic diagram of a computer system according to some examples.

FIG. 11 is a schematic diagram of a computer system 1100 for implementing examples disclosed herein. The computer system 1100 is adapted to execute instructions from a computer-readable medium to perform these and/or any of the functions or processing described herein. The computer system 1100 may be connected (e.g., networked) to other machines in a LAN, an intranet, an extranet, or the Internet. While only a single device is illustrated, the computer system 1100 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1100 may comprise at least one computing device or electronic device capable of including firmware, hardware, and/or executing software instructions to implement the functionality described herein. The computer system 1100 may include processing circuitry 1102 (e.g., processing circuitry including one or more processor devices or control units), a memory 1104, and a system bus 1106. The computer system 1100 may include at least one computing device having the processing circuitry 1102. The system bus 1106 provides an interface for system components including, but not limited to, the memory 1104 and the processing circuitry 1102. The processing circuitry 1102 may include any number of hardware components for conducting data or signal processing or for executing computer code stored in memory 1104. The processing circuitry 1102 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1102 may further include computer executable code that controls operation of the programmable device.

The system bus 1106 may be any of several types of bus structures that may further interconnect to a memory bus (with or without a memory controller), a peripheral bus, and/or a local bus using any of a variety of bus architectures. The memory 1104 may be one or more devices for storing data and/or computer code for completing or facilitating methods described herein. The memory 1104 may include database components, object code components, script components, or other types of information structure for supporting the various activities herein. Any distributed or local memory device may be utilized with the systems and methods of this description. The memory 1104 may be communicably connected to the processing circuitry 1102 (e.g., via a circuit or any other wired, wireless, or network connection) and may include computer code for executing one or more processes described herein. The memory 1104 may include non-volatile memory 1108 (e.g., read-only memory (ROM), erasable programmable read-only memory (EPROM), electrically erasable programmable read-only memory (EEPROM), etc.), and volatile memory 1110 (e.g., random-access memory (RAM)), or any other medium which can be used to carry or store desired program code in the form of machine-executable instructions or data structures and which can be accessed by a computer or other machine with processing circuitry 1102. A basic input/output system (BIOS) 1112 may be stored in the non-volatile memory 1108 and can include the basic routines that help to transfer information between elements within the computer system 1100.

The computer system 1100 may further include or be coupled to a non-transitory computer-readable storage medium such as the storage device 1114, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1114 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1114 and/or in the volatile memory 1110, which may include an operating system 1116 and/or one or more program modules 1118. All or a portion of the examples disclosed herein may be implemented as a computer program 1120 stored on a transitory or non-transitory computer-usable or computer-readable storage medium (e.g., single medium or multiple media), such as the storage device 1114, which includes complex programming instructions (e.g., complex computer-readable program code) to cause the processing circuitry 1102 to carry out actions described herein. Thus, the computer-readable program code of the computer program 1120 can comprise software instructions for implementing the functionality of the examples described herein when executed by the processing circuitry 1102. In some examples, the storage device 1114 may be a computer program product (e.g., readable storage medium) storing the computer program 1120 thereon, where at least a portion of a computer program 1120 may be loadable (e.g., into a processor) for implementing the functionality of the examples described herein when executed by the processing circuitry 1102. The processing circuitry 1102 may serve as a controller or control system for the computer system 1100 that is to implement the functionality described herein.

The computer system 1100 may include an input device interface 1122 configured to receive input and selections to be communicated to the computer system 1100 when executing instructions, such as from a keyboard, mouse, touch-sensitive surface, etc. Such input devices may be connected to the processing circuitry 1102 through the input device interface 1122 coupled to the system bus 1106 but can be connected through other interfaces, such as a parallel port, an Institute of Electrical and Electronic Engineers (IEEE) 1394 serial port, a Universal Serial Bus (USB) port, an IR interface, and the like. The computer system 1100 may include an output device interface 1124 configured to forward output, such as to a display, a video display unit (e.g., a liquid crystal display (LCD) or a cathode ray tube (CRT)). The computer system 1100 may include a communications interface 1126 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The described examples and their equivalents may be realized in software or hardware or a combination thereof. The examples may be performed by general purpose circuitry. Examples of general purpose circuitry include digital signal processors (DSP), central processing units (CPU), co-processor units, field programmable gate arrays (FPGA) and other programmable hardware. Alternatively or additionally, the examples may be performed by specialized circuitry, such as application specific integrated circuits (ASIC). The general purpose circuitry and/or the specialized circuitry may, for example, be associated with or comprised in an electronic apparatus such as a vehicle control unit.

The electronic apparatus may comprise arrangements, circuitry, and/or logic according to any of the examples described herein. Alternatively or additionally, the electronic apparatus may be configured to perform method steps according to any of the examples described herein.

Figure 12:
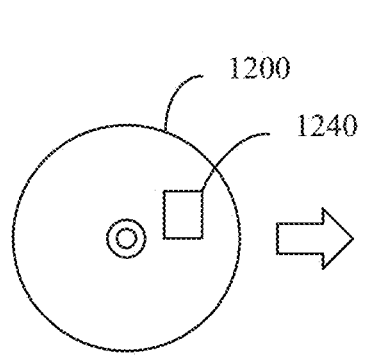
FIG. 12 is a schematic drawing of a computer readable medium according to some examples.

According to some examples, a computer program product comprises a non-transitory computer readable medium such as, for example, a universal serial bus (USB) memory, a plug-in card, an embedded drive, or a read only memory (ROM). FIG. 12 illustrates an example computer readable medium in the form of a compact disc (CD) ROM 1200. The computer readable medium has stored thereon a computer program 1240 comprising program instructions. The computer program is loadable into a data processor (e.g., a data processing unit) 1220, which may, for example, be comprised in a vehicle control unit 1210. When loaded into the data processor, the computer program may be stored in a memory 1230 associated with, or comprised in, the data processor. According to some examples, the computer program may, when loaded into, and run by, the data processor, cause execution of method steps according to, for example, any of the methods described herein.

Figure 13:
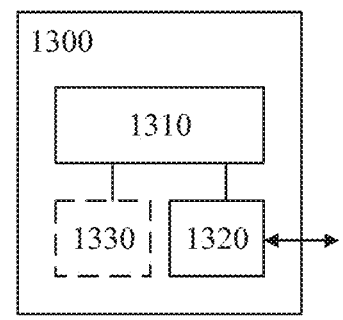
FIG. 13 is a schematic block diagram of a control unit according to some examples.

FIG. 13 schematically illustrates, in terms of a number of functional units, the components of a control unit 1300 according to some examples. The control unit may be comprised in a vehicle, e.g., in the form of a vehicle control unit. A processor device in the form of processing circuitry 1310 is provided using any combination of one or more of a suitable central processing unit (CPU), multiprocessor, microcontroller, digital signal processor (DSP), or similar; capable of executing software instructions stored in a computer program product, e.g. in the form of a storage medium 1330. The processing circuitry 1310 may further be provided as at least one application specific integrated circuit ASIC, or field programmable gate array FPGA.

Particularly, the processing circuitry 1310 is configured to cause the control unit 1300 to perform a set of operations, or steps; for example, any one or more of the methods discussed in connection to FIG. 2A and FIG. 2B.

For example, the storage medium 1330 may store a set of operations, and the processing circuitry 1310 may be configured to retrieve the set of operations from the storage medium 1330 to cause the control unit 1300 to perform the set of operations. The set of operations may be provided as a set of executable instructions. Thus, the processing circuitry 1310 is thereby arranged to execute method steps as herein disclosed.

The storage medium 1330 may comprise persistent storage, which, for example, can be any single one or combination of magnetic memory, optical memory, solid state memory or even remotely mounted memory.

The control unit 1300 may further comprise an interface 1320 for communication with at least one external device. As such, the interface 1320 may comprise one or more transmitters and receivers, comprising analogue and digital components and a suitable number of ports for wireline or wireless communication.

The processing circuitry 1310 controls the general operation of the control unit 1300, e.g., by sending data and control signals to the interface 1320 and the storage medium 1330, by receiving data and reports from the interface 1320, and by retrieving data and instructions from the storage medium 1330. Other components, as well as the related functionality, of the control node are omitted in order not to obscure the concepts presented herein.

In some examples, the control unit 1300 may be seen as a control system, or may be comprised in a control system. Such a control system may, for example, comprise the apparatus 1000 as described in connection with FIG. 10 (e.g., the processing circuitry 1310 may comprise the controller 1020 of FIG. 10).

The control system may be configured to perform or cause selection/determination of tracking point location(s) (e.g., as part of vehicle motion management) as described herein.

For example, the VCU 190 of FIG. 1 may comprise one or more of the apparatus 1000 of FIG. 10, the control system 1010 of FIG. 10, the computer system 1100 of FIG. 11, the vehicle control unit 1210 of FIG. 12, and the control unit 1300 of FIG. 13.

It should be noted that features and/or advantages described herein in connection with one of the Figures, may be equally applicable—mutatis mutandis—in the context of one or more of the other Figures, even if not explicitly mentioned herein in connection with that other Figure(s).

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Reference has been made herein to various examples. However, a person skilled in the art would recognize numerous variations to the described examples that would still fall within the scope of the claims.

For example, the methods described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the examples disclosed herein may be applied to any other example, wherever suitable. Likewise, any advantage of any of the examples may apply to any other examples.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The following is a list of some examples in relation to this disclosure:

Example 1: A computer system comprising processing circuitry configured to select a location of a tracking point for a vehicle unit of a vehicle by dynamically adapting the location of the tracking point based on a vehicle speed.

Example 2: The computer system of Example 1, wherein the vehicle unit has a front end and a rear end, with a vehicle unit longitudinal direction defined from the rear end towards the front end, and wherein dynamically adapting the location of the tracking point based on the vehicle speed comprises selecting a first location of the tracking point for a first vehicle speed and a second location of the tracking point for a second vehicle speed, wherein a direction from the second location towards the first location coincides with the vehicle unit longitudinal direction responsive to the first vehicle speed being higher than the second vehicle speed.

Example 3: The computer system of any of Examples 1 through 2, wherein two (or more) reference speeds correspond to respective reference locations of the tracking point.

Example 4: The computer system of Example 3, wherein dynamically adapting the location of the tracking point based on the vehicle speed comprises selecting, responsive to the vehicle speed being between the reference speeds, the location of the tracking point to be between the respective reference locations.

Example 5: The computer system of Example 4, wherein the selected location corresponds to a linear interpolation between the respective reference locations corresponding to the vehicle speed.

Example 6: The computer system of any of Examples 3 through 5, wherein dynamically adapting the location of the tracking point based on the vehicle speed further comprises selecting, responsive to the vehicle speed being external to an interval between the reference speeds, the location of the tracking point to be the respective reference location that corresponds to the reference speed which is closest to the vehicle speed.

Example 7: The computer system of any of Examples 1 through 6, wherein the processing circuitry is further configured to perform vehicle motion management, wherein the tracking point is used as a position representation of the vehicle unit.

Example 8: The computer system of any of Examples 1 through 7, wherein the processing circuitry is further configured to translate a desired vehicular motion for the tracking point to a corresponding desired motion for a control point of the vehicle, and determine an actuation request value based on the desired motion for the control point of the vehicle.

Example 9: The computer system of Example 8, wherein translating the desired vehicular motion for the tracking point to the corresponding desired motion for the control point comprises conditioning the translation on a zero sideslip vehicular motion for a translation point of the vehicle.

Example 10: The computer system of any of Examples 8 through 9, wherein the tracking point and the control point are on different vehicle units, and wherein translating the desired vehicular motion for the tracking point to the corresponding desired motion for the control point comprises translating the desired vehicular motion for the tracking point to an intermediate desired motion for an intermediate point of the vehicle, wherein the intermediate point represents a connection between the different vehicle units, and translating the intermediate vehicular motion to the corresponding desired motion for the control point.

Example 11: The computer system of any of Examples 1 through 10, wherein the processing circuitry is further configured to acquire the vehicle speed.

Example 12: The computer system of any of Examples 1 through 11, wherein the location of the tracking point is defined along a longitudinal axis of the vehicle unit.

Example 13: A computer system comprising processing circuitry configured to determine, for a reference speed, a reference location of a tracking point for a vehicle unit of a vehicle by evaluating vehicle motion behavior to acquire vehicle motion behavior metric values for a plurality of candidate locations of the tracking point, and selecting one of the candidate locations as the reference location based on the vehicle motion behavior metric values.

Example 14: The computer system of Example 13, wherein the selected candidate location corresponds to a minimum or maximum vehicle motion behavior metric value among the candidate locations of the plurality.

Example 15: A vehicle comprising the computer system of any of Examples 1 through 14.

Example 16: A computer-implemented method of selecting a location of a tracking point for a vehicle unit of a vehicle, the method comprising dynamically adapting, by processing circuitry of a computer system, the location of the tracking point based on a vehicle speed.

Example 17: The method of Example 16, wherein the vehicle unit has a front end and a rear end, with a vehicle unit longitudinal direction defined from the rear end towards the front end, and wherein dynamically adapting the location of the tracking point based on the vehicle speed comprises selecting a first location of the tracking point for a first vehicle speed and a second location of the tracking point for a second vehicle speed, wherein a direction from the second location towards the first location coincides with the vehicle unit longitudinal direction responsive to the first vehicle speed being higher than the second vehicle speed.

Example 18: The method of any of Examples 16 through 17, wherein two (or more) reference speeds correspond to respective reference locations of the tracking point.

Example 19: The method of Example 18, wherein dynamically adapting the location of the tracking point based on the vehicle speed comprises selecting, responsive to the vehicle speed being between the reference speeds, the location of the tracking point to be between the respective reference locations.

Example 20: The method of Example 19, wherein the selected location corresponds to a linear interpolation between the respective reference locations corresponding to the vehicle speed.

Example 21: The method of any of Examples 18 through 20, wherein dynamically adapting the location of the tracking point based on the vehicle speed further comprises selecting, responsive to the vehicle speed being external to an interval between the reference speeds, the location of the tracking point to be the respective reference location that corresponds to the reference speed which is closest to the vehicle speed.

Example 22: The method of any of Examples 16 through 21, further comprising performing vehicle motion management by the processing circuitry, wherein the tracking point is used as a position representation of the vehicle unit.

Example 23: The method of any of Examples 16 through 22, further comprising translating, by the processing circuitry, a desired vehicular motion for the tracking point to a corresponding desired motion for a control point of the vehicle, and determining, by the processing circuitry, an actuation request value based on the desired motion for the control point of the vehicle.

Example 24: The method of Example 23, wherein translating the desired vehicular motion for the tracking point to the corresponding desired motion for the control point comprises conditioning the translation on a zero side-slip vehicular motion for a translation point of the vehicle.

Example 25: The method of any of Examples 23 through 24, wherein the tracking point and the control point are on different vehicle units, and wherein translating the desired vehicular motion for the tracking point to the corresponding desired motion for the control point comprises translating the desired vehicular motion for the tracking point to an intermediate desired motion for an intermediate point of the vehicle, wherein the intermediate point represents a connection between the different vehicle units, and translating the intermediate vehicular motion to the corresponding desired motion for the control point.

Example 26: The method of any of Examples 16 through 25, further comprising acquiring the vehicle speed.

Example 27: The method of any of Examples 16 through 26, wherein the location of the tracking point is defined along a longitudinal axis of the vehicle unit.

Example 28: A computer-implemented method of determining, for a reference speed, a reference location of a tracking point for a vehicle unit of a vehicle, the method comprising evaluating vehicle motion behavior to acquire vehicle motion behavior metric values for a plurality of candidate locations of the tracking point, and selecting one of the candidate locations as the reference location based on the vehicle motion behavior metric values.

Example 29: The method of Example 28, wherein the selected candidate location corresponds to a minimum or maximum vehicle motion behavior metric value among the candidate locations of the plurality.

Example 30: A computer program product comprising program code for performing, when executed by the processing circuitry, the method of any of Examples 16 through 29.

Example 31: A non-transitory computer-readable storage medium comprising instructions, which when executed by processing circuitry, cause the processing circuitry to perform the method of any of Examples 16 through 29.

Example 32: An apparatus for selecting a location of a tracking point for a vehicle unit of a vehicle, the apparatus comprising controlling circuitry configured to cause dynamic adaptation of the location of the tracking point based on a vehicle speed.

Example 33: The apparatus of Example 32, wherein the vehicle unit has a front end and a rear end, with a vehicle unit longitudinal direction defined from the rear end towards the front end, and wherein dynamic adaptation of the location of the tracking point based on the vehicle speed comprises selection of a first location of the tracking point for a first vehicle speed and a second location of the tracking point for a second vehicle speed, wherein a direction from the second location towards the first location coincides with the vehicle unit longitudinal direction responsive to the first vehicle speed being higher than the second vehicle speed.

Example 34: The apparatus of any of Examples 32 through 33, wherein two (or more) reference speeds correspond to respective reference locations of the tracking point.

Example 35: The apparatus of Example 34, wherein dynamic adaptation of the location of the tracking point based on the vehicle speed comprises selection, responsive to the vehicle speed being between the reference speeds, of the location of the tracking point to be between the respective reference locations.

Example 36: The apparatus of Example 35, wherein the selected location corresponds to a linear interpolation between the respective reference locations corresponding to the vehicle speed.

Example 37: The apparatus of any of Examples 35 through 36, wherein dynamic adaptation of the location of the tracking point based on the vehicle speed further comprises selection, responsive to the vehicle speed being external to an interval between the reference speeds, of the location of the tracking point to be the respective reference location that corresponds to the reference speed which is closest to the vehicle speed.

Example 38: The apparatus of any of Examples 32 through 37, wherein the controlling circuitry is further configured to cause performance of vehicle motion management, wherein the tracking point is used as a position representation of the vehicle unit.

Example 39: The apparatus of any of Examples 32 through 38, wherein the controlling circuitry is further configured to cause translation of a desired vehicular motion for the tracking point to a corresponding desired motion for a control point of the vehicle, and determination of an actuation request value based on the desired motion for the control point of the vehicle.

Example 40: The apparatus of Example 39, wherein translation of the desired vehicular motion for the tracking point to the corresponding desired motion for the control point comprises conditioning the translation on a zero side-slip vehicular motion for a translation point of the vehicle.

Example 41: The apparatus of any of Examples 39 through 40, wherein the tracking point and the control point are on different vehicle units, and wherein translation of the desired vehicular motion for the tracking point to the corresponding desired motion for the control point comprises translation of the desired vehicular motion for the tracking point to an intermediate desired motion for an intermediate point of the vehicle, wherein the intermediate point represents a connection between the different vehicle units, and translation of the intermediate vehicular motion to the corresponding desired motion for the control point.

Example 42: The apparatus of any of Examples 32 through 41, wherein the controlling circuitry is further configured to cause acquisition of the vehicle speed.

Example 43: The apparatus of any of Examples 32 through 42, wherein the location of the tracking point is defined along a longitudinal axis of the vehicle unit.

Example 44: An apparatus for determining, for a reference speed, a reference location of a tracking point for a vehicle unit of a vehicle, the apparatus comprising controlling circuitry configured to cause evaluation of vehicle motion behavior to acquire vehicle motion behavior metric values for a plurality of candidate locations of the tracking point, and selection of one of the candidate locations as the reference location based on the vehicle motion behavior metric values.

Example 45: The apparatus of Example 44, wherein the selected candidate location corresponds to a minimum or maximum vehicle motion behavior metric value among the candidate locations of the plurality.

What is claimed is:

1. A computer system comprising processing circuitry configured to select a location of a tracking point for a vehicle unit of a vehicle by:

dynamically adapting the location of the tracking point based on a vehicle speed,
wherein the vehicle unit has a front end and a rear end, with a vehicle unit longitudinal direction defined from the rear end towards the front end, and wherein dynamically adapting the location of the tracking point based on the vehicle speed comprises:
selecting a first location of the tracking point for a first vehicle speed and a second location of the tracking point for a second vehicle speed, wherein a direction from the second location towards the first location coincides with the vehicle unit longitudinal direction responsive to the first vehicle speed being higher than the second vehicle speed.

2. A computer system comprising processing circuitry configured to determine, for a reference speed, a reference location of a tracking point for a vehicle unit of a vehicle by:
evaluating vehicle motion behavior to acquire vehicle motion behavior metric values for a plurality of candidate locations of the tracking point,
selecting one of the candidate locations as the reference location based on the vehicle motion behavior metric values; and
wherein the selected candidate location corresponds to a minimum or maximum vehicle motion behavior metric value among the candidate locations of the plurality.

3. A vehicle comprising the computer system of claim 1.

4. A computer-implemented method of selecting a location of a tracking point for a vehicle unit of a vehicle, the method comprising:
dynamically adapting, by processing circuitry of a computer system, the location of the tracking point based on a vehicle speed,
wherein the vehicle unit has a front end and a rear end, with a vehicle unit longitudinal direction defined from the rear end towards the front end, and wherein dynamically adapting the location of the tracking point based on the vehicle speed comprises:
selecting a first location of the tracking point for a first vehicle speed and a second location of the tracking point for a second vehicle speed, wherein a direction from the second location towards the first location coincides with the vehicle unit longitudinal direction responsive to the first vehicle speed being higher than the second vehicle speed.

5. The method of claim 4, wherein two reference speeds correspond to respective reference locations of the tracking point.

6. The method of claim 5, wherein dynamically adapting the location of the tracking point based on the vehicle speed comprises:
selecting, responsive to the vehicle speed being between the reference speeds, the location of the tracking point to be between the respective reference locations.

7. The method of claim 6, wherein the selected location corresponds to a linear interpolation between the respective reference locations corresponding to the vehicle speed.

8. The method of claim 5, wherein dynamically adapting the location of the tracking point based on the vehicle speed further comprises:

selecting, responsive to the vehicle speed being external to an interval between the reference speeds, the location of the tracking point to be the respective reference location that corresponds to the reference speed which is closest to the vehicle speed.

9. The method of claim 4, further comprising:
performing vehicle motion management by the processing circuitry, wherein the tracking point is used as a position representation of the vehicle unit.

10. The method of claim 4, further comprising:
translating, by the processing circuitry, a desired vehicular motion for the tracking point to a corresponding desired motion for a control point of the vehicle; and
determining, by the processing circuitry, an actuation request value based on the desired motion for the control point of the vehicle.

11. The method of claim 10, wherein translating the desired vehicular motion for the tracking point to the corresponding desired motion for the control point comprises:
conditioning the translation on a zero side-slip vehicular motion for a translation point of the vehicle.

12. The method of claim 10, wherein the tracking point and the control point are on different vehicle units, and wherein translating the desired vehicular motion for the tracking point to the corresponding desired motion for the control point comprises:
translating the desired vehicular motion for the tracking point to an intermediate desired motion for an intermediate point of the vehicle, wherein the intermediate point represents a connection between the different vehicle units; and
translating the intermediate vehicular motion to the corresponding desired motion for the control point.

13. The method of claim 4, further comprising acquiring the vehicle speed.

14. The method of claim 4, wherein the location of the tracking point is defined along a longitudinal axis of the vehicle unit.

15. A computer-implemented method of determining, for a reference speed, a reference location of a tracking point for a vehicle unit of a vehicle, the method comprising:
evaluating vehicle motion behavior to acquire vehicle motion behavior metric values for a plurality of candidate locations of the tracking point,
selecting one of the candidate locations as the reference location based on the vehicle motion behavior metric values; and
wherein the selected candidate location corresponds to a minimum or maximum vehicle motion behavior metric value among the candidate locations of the plurality.

16. A computer program product comprising program code for performing, when executed by the processing circuitry, the method of claim 4.

17. A non-transitory computer-readable storage medium comprising instructions, which when executed by processing circuitry, cause the processing circuitry to perform the method of claim 4.

* * * * *